March 11, 1969 A. BEZIMENSKY 3,431,728
HYDRODYNAMIC TRANSMISSION DEVICES
Filed Oct. 23, 1967
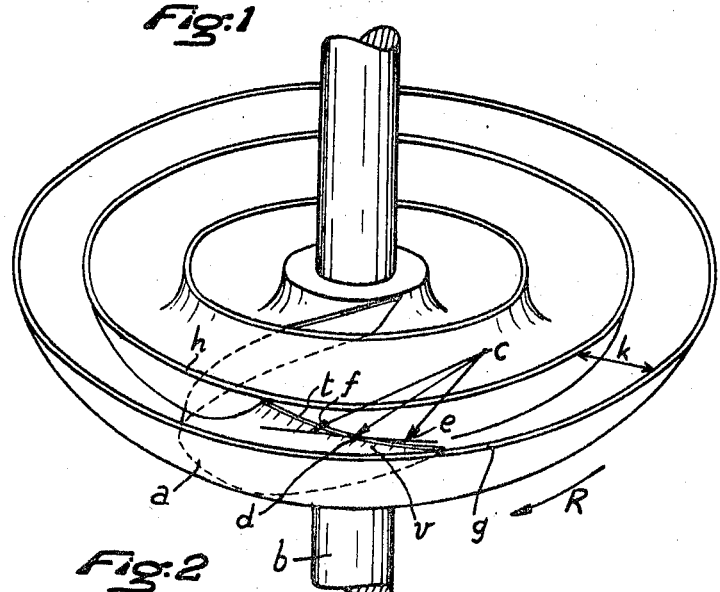
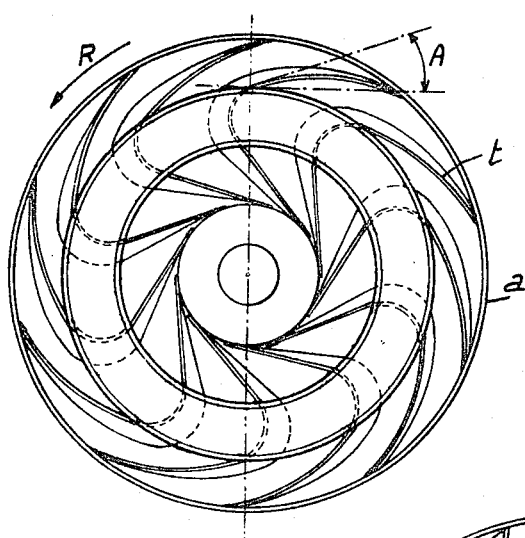
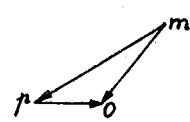
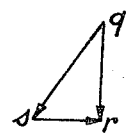
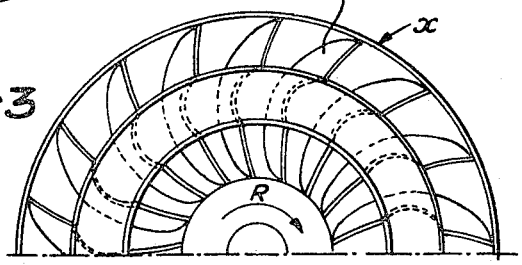
INVENTOR
ALEXANDRE BEZIMENSKY
BY Stevens, Davis, Miller & Mosher
ATTORNEYS

United States Patent Office 3,431,728
Patented Mar. 11, 1969

3,431,728
HYDRODYNAMIC TRANSMMISSION DEVICES
Alexandre Bezimensky, 39 Rue de Boulainvilliers,
Paris, France
Filed Oct. 23, 1967, Ser. No. 677,146
Claims priority, application France, Oct. 29, 1966,
82,111
U.S. Cl. 60—54                                                 5 Claims
Int. Cl. F16d 33/00

ABSTRACT OF THE DISCLOSURE

Hydrodynamic transmission device such as a coupler or a torque converter, which comprises a pump and a turbine of the vane type arranged to constitute a toroidal fluid circuit, characterised in that the configuration of the leading edge of the turbine vanes is obtained from the fictitious sheet formed by the vectors representing a mean fluid stream issuing from the pump and taken under different angles of attack of the turbine for the range of relative velocities of the turbine with respect to a normal given pump driving velocity, said configuration being furthermore obtained by causing said sheet to revolve about the mean vector to bring same in the plane of the inlet opening of the turbine, the edge of said sheet then representing the configuration of the leading edge.

---

This invention relates to hydrodynamic power transmission devices generally referred to as torque converters, fluid flywheels or hydraulic couplings, which comprise at least one pump and a turbine having spaced vanes and arranged to constitute a toroidal fluid circuit.

In order to obtain an adequate efficiency the fluid stream must inpinge against the turbine vanes with a preferential angle. Now in applications such as the now conventional automotive torque converter, wherein the pump speed should not vary appreciably under normal driving conditions in order to obtain the optimum efficiency from the motor driving this pump, but wherein the turbine speed must be variable from zero to a maximum speed, it is obviously difficult to achieve a satisfactory compromise leading to a good efficiency, and this constitutes a known inconvenience of the devices discussed herein.

It is the object of the present invention to provide improvements in hydrodynamic devices of the kind referred to hereinabove, whereby an efficiency satisfactory at all speeds is obtained by providing a novel vane design.

This invention is characterised essentially in that the configuration of the leading edge of the turbine vanes is obtained from the fictitious sheet resulting from vectors corresponding to a mean fluid stream issuing from the pump and considered from the different angles of attack of the turbine for the range of relative velocity thereof with respect to a normal predetermined pump driving speed, said configuration being further obtained by causing said sheet to rotate about said mean vector so as to bring said sheet in the plane of the inlet opening of the turbine, the edge of said sheet then representing the configuration of the leading edge.

Moreover, with this arrangement the pump vanes are advantageously curved forwards, in the direction of rotation.

A specific form of embodiment of this invention will now be described by way of example with reference to the accompanying drawing, in which:

FIGURE 1 is a perspective view of the turbine rotor showing only one set of vanes;

FIGURE 2 is a diagrammatic plane view of the turbine rotor which shows the ends of the turbine vanes;

FIGURE 3 is a plane view showing the pump, the vanes thereof being shown only partially; and FIGURES 4 and 5 are two comparative diagrams referring to the arrangement illustrated in FIGURE 3.

In all the figures of the drawing the direction of rotation is shown by an arrow R.

FIGURE 1 shows a turbine of which the rotor or body $a$ is rotatably mounted about a shaft $b$ to constitute notably an annular fluid inlet opening $k$.

Considering a separate fluid stream or jet delivered from the pump (not shown) and as seen from the turbine, and assuming that this fluid stream or jet is contained in the plane tangent to the mean radius of said annular opening $k$, the fluid stream follows different paths in relation to the turbine, according to the relative velocity obtaining between the turbine and the pump, in other words, as illustrated in FIGURE 1, this stream may be contained in the fictitious sheet $c$–$e$–$f$ wherein the vector $c$–$d$ designates the mean stream and vectors $c$–$e$ and $c$–$f$ designate the fluid stream at the minimum and maximum relative speed between the turbine and pump, respectively.

A plane or curved surface containing the aforesaid vector $c$–$d$ (which is the mean direction of the fluid streams or jets) is attacked under a correct angle by the fluid when it is coincident with the sheet $c$–$e$–$f$. In its actual embodiment the present invention is based on the approached solution consisting, for defining the leading edge $t$ of vanes $v$, to cause said sheet to pivot slightly about said vector $c$–$d$ in order to interconnect the two edges $g$ and $h$ of the annular opening $k$ receiving the fluid delivered by the pump.

This leads in practice to a range of orientations such that the leading edge forms at all its points with the plane tangent to the corresponding turbine radius an angle A of 15° to 30° (see FIGURE 2). Moreover, the surface of vanes $t$ which constitutes the direct extension of the leading edge is preferably oriented in the direction of the fluid stream of said sheet which corresponds to the relative velocity of the pump and turbine whereat it is desired to obtain the maximum efficiency of the device.

It will be noted that in comparison with conventional devices having a substantially radial turbine vane leading edge and wherein the angle of said sheet extends through approximately 30°, the above-defined orientation of the leading edge of the vane system according to this invention permits of reducing from about 30° to about 8° the angle under which the vane inlet is attacked by the fluid delivered by the pump.

As a result, when the pump-to-turbine relative speed is other than the above defined velocity giving the maximum efficiency, the arrangement according to this invention affords an acceptable efficiency definitely higher than that resulting from conventional arrangements.

Also according to this invention the higher efficiency resulting from this turbine vane contour may be further improved by curving the ends of the vanes $w$ of pump $x$ in the direction of rotation (see FIGURE 3). The corresponding increment in the tangential component of the fluid streams issuing from the pump will cause these streams to attack the turbine inlet plane under a more "grazing" angle. This will be readily apparent from a comparison between the velocity diagram $m$–$o$–$p$ of FIGURE 4 and the velocity diagram $q$–$r$–$s$ of FIGURE 5; thus, it will be seen that given a same speed difference $o$–$p$ equal to $r$–$s$ of the turbine, the angle formed between the endmost streams $m$–$o$ and $m$–$p$ is smaller in the case of "grazing" streams than in the case of streams $q$–$r$ and $q$–$s$ attacking the joint plane of the pump and turbine assembly under a greater angle. The forward curvature of the pump vanes will therefore reduce the amplitude in the variation of the angle of attack of the turbine vanes by the fluid streams or jets and assists in increasing accordingly the efficiency of the device.

An angle of curvature of about 10° will provide a satisfactory result.

I claim:

1. Hydrodynamic transmission device such as a coupler or a torque converter, which comprises a pump and a turbine of the vane type arranged to constitute a toroidal fluid circuit, characterised in that the configuration of the leading edge of the turbine vanes is obtained from the fictitious sheet formed by the vectors representing a mean fluid stream issuing from the pump and taken under different angles of attack of the turbine for the range of relative velocities of the turbine with respect to a normal given pump driving velocity, said configuration being furthermore obtained by causing said sheet to revolve about the mean vector to bring same in the plane of the inlet opening of the turbine, the edge of said sheet then representing the configuration of the leading edge.

2. Device according to claim 1, characterised in that in all points said leading edge forms with a plane tangent to the corresponding turbine radius an angle of 15° to 30°.

3. Device according to claim 1, characterised in that the surface of the turbine vanes which constitutes the adjacent extension of the leading edges of said vanes is directed toward one of said vectors.

4. Device according to claim 1, characterised in that the vanes provided at the outlet of said pump are curved forwards, in the direction of rotation.

5. Device according to claim 4, characterised in that the angle of curvature of said pump vanes is approximately 10°.

References Cited

UNITED STATES PATENTS

| | | | |
|---|---|---|---|
| 2,663,148 | 12/1953 | Jandasek | 60—54 |
| 2,663,149 | 12/1953 | Zeidler et al. | 60—54 |
| 3,002,356 | 10/1961 | Black et al. | 60—54 |

EDGAR W. GEOGHEGAN, *Primary Examiner.*

U.S. Cl. X.R.

103—115